(12) United States Patent
Barrett et al.

(10) Patent No.: US 6,392,235 B1
(45) Date of Patent: May 21, 2002

(54) CODED-APERTURE SYSTEM FOR PLANAR IMAGING OF VOLUMETRIC SOURCES

(75) Inventors: Harrison H. Barrett; Eric Clarkson; Donald W. Wilson, all of Tucson, AZ (US)

(73) Assignee: The Arizona Board of Regents on behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 09/504,417

(22) Filed: Feb. 15, 2000

Related U.S. Application Data

(60) Provisional application No. 60/120,930, filed on Feb. 22, 1999.

(51) Int. Cl.⁷ .............................. G01T 1/161; G01T 1/29
(52) U.S. Cl. .......................... 250/363.06; 250/363.07; 250/363.1; 250/369; 250/371; 378/62; 378/149
(58) Field of Search ..................... 250/363.06, 363.07, 250/363.1, 369, 370.09, 370.08, 371; 378/62, 147, 149

(56) References Cited

U.S. PATENT DOCUMENTS

| | | | | |
|---|---|---|---|---|
| 4,360,797 A | * | 11/1982 | Fenimore et al. | 382/278 |
| 4,435,838 A | * | 3/1984 | Gourlay | 382/312 |
| 4,506,374 A | * | 3/1985 | Flynn | 378/2 |
| 4,514,632 A | * | 4/1985 | Barret | 250/368 |
| 5,245,191 A | | 9/1993 | Barber et al. | 250/363.04 |
| 5,565,914 A | * | 10/1996 | Motta | 348/294 |
| 5,606,165 A | * | 2/1997 | Chiou et al. | 250/363.06 |
| 5,757,005 A | * | 5/1998 | Callas et al. | 250/363.06 |
| 5,825,033 A | | 10/1998 | Barrett et al. | 250/370.1 |
| 5,930,314 A | * | 7/1999 | Lanza | 376/159 |

FOREIGN PATENT DOCUMENTS

JP 58-92939 A * 6/1983 ............ 250/363.03

* cited by examiner

*Primary Examiner*—Constantine Hannaher
*Assistant Examiner*—Albert Gagliardi
(74) *Attorney, Agent, or Firm*—Antonio R. Durando; Durando Birdwell & Janke, PLC

(57) ABSTRACT

A coded aperture is placed in proximity of a patient's body and a 2D coded image is acquired in conventional manner. The basic data-acquisition geometry is similar to that used in various coded-aperture systems. According to one aspect of the invention, additional coded images are acquired with different spacings between the aperture and the detector. Alternatively, additional coded images could be acquired with multiple movable apertures or by varying the location of the aperture relative to a patient. Another aspect of the invention resides in the recognition that presently available computer algorithms can process these multiple coded images in such a way as to estimate the integrals of the 3D object over a set of parallel cylindrical tubes extending through the volume of the target object. Such "tube integrals" can be thought of as the output of an ideal collimator where the sensitivity is confined to a tubular region of constant cross-section.

20 Claims, 23 Drawing Sheets

DETECTOR
_____

- - - - - - - APERTURE

OBJECT

CODED-APERTURE SYSTEM FOR PLANAR IMAGING OF VOLUMETRIC SOURCES

RELATED APPLICATIONS

This application is based on Provisional Application No. 60/120,930, filed on Feb. 22, 1999.

U.S. GOVERNMENT RIGHTS

This invention was made with Federal Government support under contract number CA52643-10 awarded by the National Institute of Cancer. The Government has certain rights in the invention.

BACKGROUND OF THE INVENTION

1. Field of the Invention

This invention is related to the general field of gamma-ray imaging. In particular, the invention provides a new method and a new coded-aperture system for detecting gamma radiation emitted from an object under examination and constructing an image corresponding to the spatial distribution of the source of radiation within the object.

2. Description of the Prior Art

Coded-aperture systems were first suggested in the 1960s for use in x-ray astronomy, where the objects of interest are essentially two-dimensional. This idea was exciting at the time because a coded aperture could be far more efficient than conventional pinhole apertures of collimators in collecting radiation such as x-ray photons. It was later understood that more photons were required with a coded aperture than with a pinhole because each photon conveyed less information about the source. Nevertheless, for many kinds of sources, coded apertures offer a considerable net advantage, and they continue to be actively used in x-ray and gamma-ray astronomy today.

The concept of coded apertures was later extended to nuclear medicine, where the objective is a volumetric, or three-dimensional (3D), distribution of a radioactive tracer. This application of coded apertures has been studied extensively during the past 25 years, and its mathematical and engineering aspects are well understood in the art. In particular, it is generally agreed that a single coded image taken with an aperture at a fixed location is an inadequate data set for accurate 3D tomographic reconstruction. The basic reason is that radiation from each point in the object is collected only over a very limited range of angles.

Several approaches have been proposed to overcome this limited-angle problem. One is to use many different apertures, either at the same location or, preferably, at different angular positions around the object to be imaged. As one skilled in the art would readily appreciate, the reconstruction problem then becomes more complicated because the data consist of many different 2D images; nevertheless, it is well within the capability of modern computers and algorithms currently in use in the art. The main drawback is the mechanical complexity of such systems and the fact that the net advantage in collection efficiency is marginal for large three-dimensional objects.

To take full advantage of coded apertures, a detector with high spatial resolution is required, and the scintillation detectors used routinely in nuclear medicine are deficient in this respect. The best scintillation cameras have a spatial resolution of only about 2–3 mm, and there is very little prospect for any substantial improvement.

Accordingly, much effort has been devoted to the development of a new generation of semiconductor gamma-ray detectors for use in nuclear medicine. Such detectors consist of a slab of semiconductor material, such as cadmium zinc telluride, and a multiplexer readout circuit. For example, a 64×64 detector array with a spatial resolution of 0.38 mm, an order of magnitude better than scintillation cameras, has already been tested successfully in the art (see U.S. Pats. No. 5,245,191 and No. 5,825,033, hereby incorporated by reference) and work on developing new imaging systems to take full advantage of this capability is in progress. The ultimate goal is to build a high-resolution tomographic imaging system based on semiconductor detectors and either conventional pinhole apertures or coded apertures.

The considerable interest found in semiconductor gamma-ray detector arrays arises from the improvements they are able to provide over scintillation cameras in a variety of applications. These devices can be used in nuclear medicine, diagnostic radiology, molecular biology, gamma-ray astronomy, particle-physics and nuclear-weapon applications. Therefore, it is expected that a high-quality semiconductor array combined with improved data processing techniques will have a substantial commercial and scientific impact.

The present application concerns a novel approach in the way data are generated by detector arrays and processed for medical-imaging applications. Because of the background that lead to the invention, this disclosure is based on data and experiments related to the medical field, but its application pertains to all disciplines that can utilize semiconductor sensors for gamma-ray detection.

The goal of medical imaging is to provide a spatial mapping of some parameter, feature, or process within a biological entity. Emission imaging (or nuclear medicine) comprises a class of imaging techniques that produce a functional mapping of the object under observation. Generally speaking, the techniques used in nuclear medicine involve the injection of a radioactive substance into a patient's body and the measurement of the emitted radiation (gamma rays) by radiation sensitive detectors through a system of apertures in an impermeable medium. Typically, before injection the radioactive tracer (radionuclide) is combined with a substance that is known to be preferentially concentrated in the organ of interest, so that the preferential concentration of the resulting radiopharmaceutical will correspond to an indication of blood flow, metabolism, or receptor density within the organ. Thus, an image of the resulting radioactive distribution within the organ of interest will yield functional information about the organ. Either a single projection image of the emission distribution may be taken (planar imaging) or many projection images may be acquired from different directions and used to compute the three dimensional emission distribution (single photon emission computed tomography, generally referred to as SPECT).

Since photons in the energy range used in nuclear medicine are not substantially refracted or reflected, data are collected by placing attenuating apertures between the patient and the detector plane, so that each detector has an associated field of view defined by the aperture. Photons that are recorded by a particular detector element in the detector plane are known to have originated in a certain small portion of the object space. The number of photons detected by a given detector is proportional to a weighted integral of the activity contained in the region it sees. By utilizing the information collected by many detector elements or cells, each viewing different but overlapping regions of the object space, an estimate of the original activity distribution can be produced by a reconstruction algorithm according to analytical methods and techniques that are well understood by those skilled in the art.

Different kinds of apertures are commonly used to provide the desired select field of view of an object. For example, parallel-hole collimators, focused collimators, single and multiple pinhole attenuators, and several other apertures that can be used to restrict the path of the gamma rays between the radioactive object and the detector in a tomographic imaging system. In each case, each detector element ideally receives radiation from a single line from the object through the aperture of the system. U.S. Pats. No. 5,245,191 and No. 5,825,033 describe the use of a semiconductor detector array in combination with multiple-pinhole apertures to produce an improved tomographic imaging system.

Not all imaging in nuclear medicine is tomographic, however. Most routine studies are performed with simple parallel-bore collimators, and the resulting image is a 2D projection of the 3D object. Common jargon for this approach is "planar imaging," implying not that the object is planar but that the resulting image is.

The improved semiconductor detectors could be used for planar imaging, but the overall spatial resolution would still be severely limited by the collimator. The bore size in currently available collimators is 1–3 mm, which establishes an absolute lower limit to the resolution in the image. For a thin object in contact with the face of the collimator, the resolution is essentially the same as the bore diameter. With volumetric objects, moreover, the resolution degrades substantially with depth in the object. Photons originating from a point far from the collimator face can pass through several adjacent bores, and in practice the final spatial resolution in planar nuclear-medicine imaging is 10–15 mm. While such images are still very valuable clinically, it is apparent that a better spatial resolution is highly desirable and in some cases necessary.

New fabrication techniques that would produce collimators with finer bores have been considered, but the engineering tradeoffs are not attractive. Using smaller bore diameters with the same bore length, collection efficiency would fall off as the square of the diameter. Choosing instead to shrink all dimensions together, the resolution at the collimator face could be improved, but it would degrade more rapidly with depth in the object. In short, except possibly for specialized applications with thin objects, there is relatively little to be gained by using semiconductor detectors for planar imaging with collimators.

In summary, the parallel-hole collimators routinely used in nuclear medicine suffer from several deficiencies. Their efficiency for photon collection is relatively poor and can be improved only at the expense of spatial resolution, and the resolution degrades rapidly with distance away from the face of the collimator. Even if the poor efficiency could be tolerated, high-resolution collimators would be very difficult to fabricate. Thus, there remains a need for an improved system of data collection and processing for planar imaging of volumetric sources. This invention consists of a new data-gathering approach that improves many of the limitations of existing systems.

BRIEF SUMMARY OF THE INVENTION

The main objective of the invention is the development of a high-resolution alternative to the parallel-hole collimator for planar imaging.

Another goal is a system for obtaining parallel projections of a 3D object using a coded-aperture system instead of a parallel-bore collimator.

Another object of the invention is a system that affords a more efficient collection of photons than a collimator with even coarser resolution is able to provide.

Finally, an objective is the implementation of the invention in a commercially viable system that maximizes the utilization of existing technology.

According to these and other objectives, a coded aperture is placed in proximity of a patient's body and a 2D coded image is acquired in conventional manner. The basic data-acquisition geometry, illustrated in FIG. 1, is similar to that used in various coded-aperture systems. According to one aspect of the invention, additional coded images are acquired with different spacings between the aperture and the detector. Alternatively, additional coded images could be acquired with multiple movable apertures or by varying the location of the aperture relative to the patient.

Another aspect of the invention resides in the recognition that presently available computer algorithms can process these multiple coded images in such a way as to estimate the integrals of the 3D object over a set of parallel cylindrical tubes extending through the volume of the target object, as illustrated in FIG. 2. Such "tube integrals" can be thought of as the output of an ideal collimator where the sensitivity is confined to a tubular region of constant cross-section.

As those skilled in the art readily understand, real collimators do not achieve this ideal condition for many reasons. As noted above, the spatial resolution of a collimator varies with depth, so that the region of integration is more like a thin cone than a cylinder, as illustrated in FIG. 3, and the sensitivity varies with position within the region. In addition, attenuation of the radiation in a patient's body also causes a variation in sensitivity along the axis of the cone, and penetration of the radiation through the collimator material can further cause significant sensitivity to radiation well outside the cone.

All of these effects can be corrected by data processing according to the method of the invention, thereby producing a resulting image that is superficially similar to one obtained by a collimator, but where the spatial resolution is appreciably improved and remains approximately constant over a substantial range of depths in the object. In addition, many more photons are collected in comparison to a collimator.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DETAILED DESCRIPTION OF THE INVENTION

To understand the objective of the invention, which can be described as the implementation of a "synthetic collimator," it is useful first to define an ideal parallel-hole collimator. Such a device, which in practice is physically unrealizable, would be able to acquire a two-dimensional (2D) projection of a three-dimensional (3D) object with a spatial resolution and sensitivity independent of position in the object. More precisely, a detector element placed behind one bore of the ideal collimator would be uniformly sensitive to radiation emanating from anywhere in a tube-like region of space formed by mathematically extending the bore into the object, and it would be totally insensitive to radiation originating outside this tube. Such a detector would therefore measure the integral of the object activity over this tube region, and all other detector elements would do the same for other tubes. The collection of such tube integrals is the ideal planar projection. The synthetic collimator of the invention involves the collection of data sets from which an estimate of these tube integrals can be derived with conventional mathematical operations.

Figure 1:
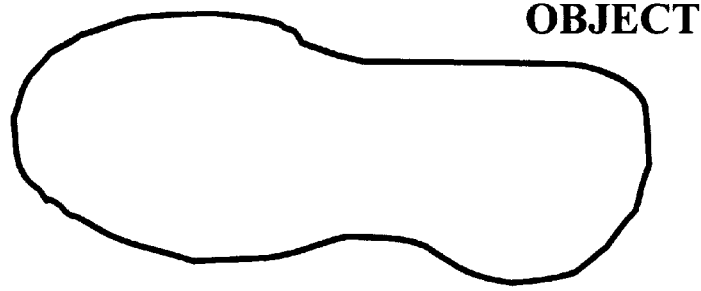
FIG. 1 is a schematic representation of a basic data-acquisition geometry of a coded-aperture system.
Figure 2:
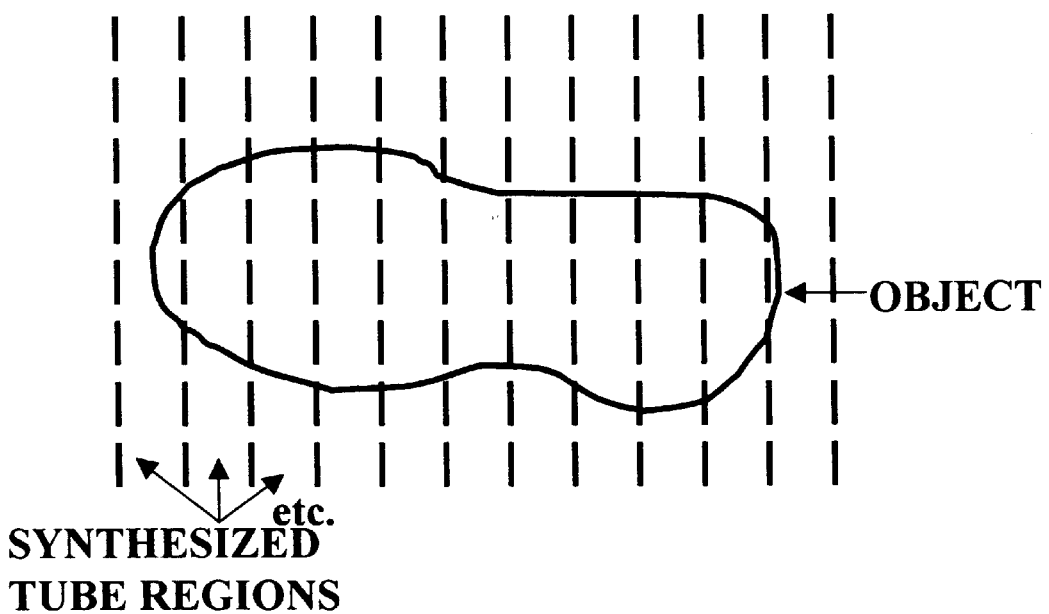
FIG. 2 illustrates a set of parallel cylindrical tubes extending through the volume of a target object; the present invention estimates the integrals of the 3D object over such tubes.
Figure 3:
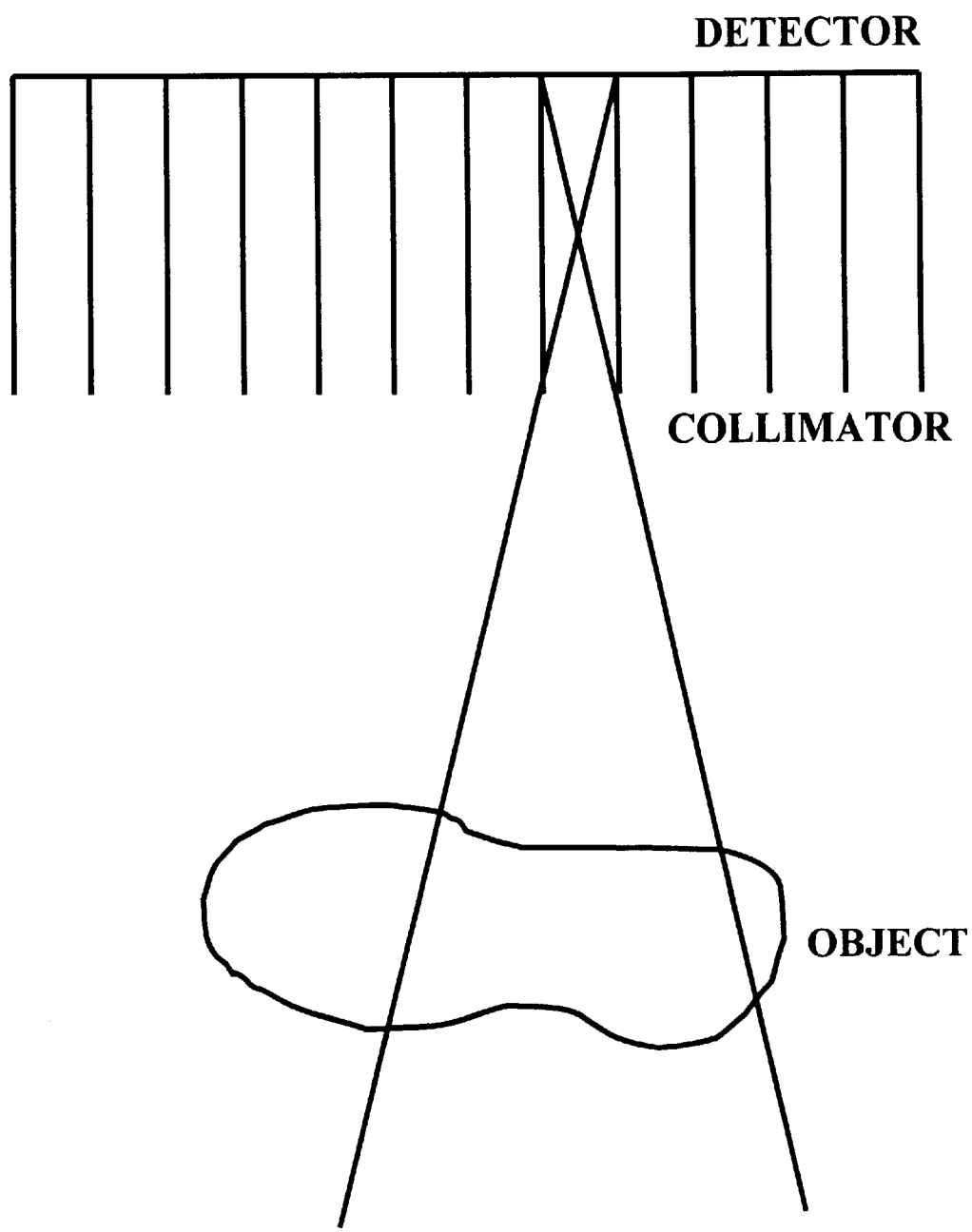
FIG. 3 illustrates the cone corresponding to the spatial resolution of a collimator and its variance with depth.
Figure 4:
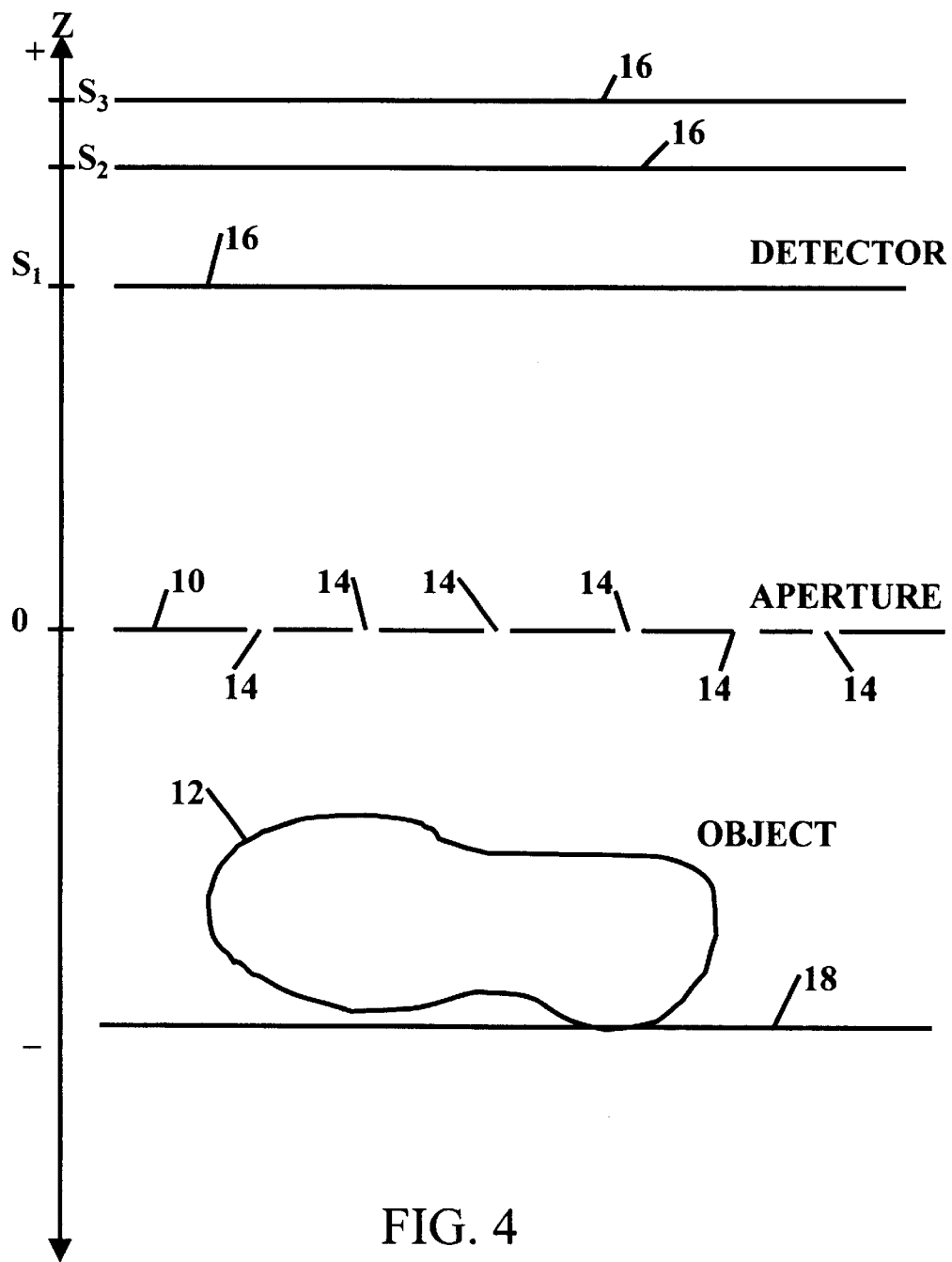
FIG. 4 is a schematic representation of the data-acquisition geometry of the coded-aperture system used to practice the invention.

We found that a suitable data set for this purpose can be collected using a simple multiple-pinhole aperture. Referring to FIG. 4, a plate 10 of gamma-ray-absorbing material is placed in a plane z=0 between an object and a detector. The object 12 is contained on a support stage 18 in the halfspace below the plate 10, which is essentially opaque except for K small pinholes 14. The image detector 16 is placed in the plane above the plate at a distance $s_1$. In the absence of noise, the $m^{th}$ detector element records a measurement $g_m$ of gamma ray reception (photon flux, typically measured in counts) is given by $$g_m = \int_S f(r) h_m(r) d^3 r, \quad (1)$$

where r is a 3D vector, f(r) is the object activity (that is, the concentration of radioisotope tracer at point r in the object, measured in millicure/cm$^3$), S is the region of support of the object, and $h_m(r)$ is a sensitivity function that specifies the response of the detector to radiation emanating from point r (that is, the probability that a photon emanating from point r will be detected by the mth detector element). If the detector can "see" the object through all K pinholes, then $h_m(r)$ is appreciable over K cone-like regions through the object. If the detector cannot see the object through any pinhole, then $h_m(r)$ is zero.

The parameters we wish to estimate are the ideal tube integrals, which for tube j, for example, are given by $$\theta_j = \int f(r) t_j(r) d^3 r, \quad (2)$$

where $t_j(r)$ is a tube function, defined to be unity in the region spanned by the $j^{th}$ tube and zero elsewhere. The key question is whether we can recover the values of $\theta_j$ from the measured data {g}, at least in the absence of noise. We found that the answer is yes if each tube function is written as a linear superposition of the sensitivity functions, so that $$t_j(r) = \Sigma_m B_{jm} h_m(r), \quad (3)$$

where $B_{jm}$ is a matrix of linear superposition coefficients. If this condition can be satisfied, then all of the tube integrals can be found by $$\theta_j = \Sigma_m B_{jm} g_m. \quad (4)$$

Many simulation studies were performed to determine the circumstances under which this synthesis can be accomplished. We found that a single multiple-pinhole image is not sufficient; it is clearly necessary to collect additional information. When multiple data sets were collected by varying the aperture-to-detector distance by multiple values $s_2$, $s_3$, etc., simulations and theoretical analysis showed that an excellent approximation to the ideal collimator can be synthesized.

In practice, multiple measurements are collected at N different pinhole-to-detector distances, producing the data vector g={g$^{(1)}$, g$^{(2)}$, ... g$^{(N)}$}. Thus, with a detector having M pixels, g would contain M×N elements g={g$_1^{(1)}$, g$_2^{(1)}$, ... g$_M^{(1)}$, g$_1^{(2)}$, g$_2^{(2)}$, ... g$_m(2)$;, ... ; g$_1^{(N)}$, g$_2^{(N)}$, ... g$_M^{(N)}$}. Similarly, the total sensitivity function matrix used for the reconstruction algorith is H={H$^{(1)}$,H$^{(2)}$, H$^{(3)}$,...,H$^{(N)}$}, where each element h$_n$(i,j)∈H represents the probability that a photon emitted in voxel j of the object would be detected by pixel i of the detector from its n$^{th}$ pinhole-to-detector distance.

The total imaging-system equation is thus assumed to be g=Hf, with g, H and f defined above. The projection, g, is collected by the system and the system matrix, H, is calculated either by directly measuring the system response with a point source or by using a computer model to generate the system response to a point. The distribution, f, is what the reconstruction algorithm attempts to estimate.

In the preferred embodiment of the invention, the estimation of f is carried out using a maximum-likelihood expectation-maximization (ML-EM) algorithm. H is calculated on a three-dimensional (3D) grid, and the estimate $f_{est}$ is reconstructed on that 3D grid using ML-EM. The 2D planar projection image (the synthetic-collimator image) is then estimated by summing $f_{est}$ in the direction perpendicular to the face of the collimator-detector plane along each parallel, ideal collimator tube.

The estimate of f is typically obtained by inverting the equation g=Hf. The ML-EM algorithm can be shown to converge to an f that, at convergence, minimizes the mean-square error between g and Hf. A result was produced even in the presence of noise, under the assumption that it was characterized by a Poisson distribution. ML-EM is an iterative algorithm, and the $k+1^{st}$ estimate of the $j^{th}$ element of f is $$\bar{f}_j^{(k+1)} = \frac{\bar{f}_j^{(k)}}{\sum_i h_{ij}} \sum_i \frac{h_{ij} g_i}{\sum_l h_{il} \bar{f}_l^{(k)}} \quad (5)$$

where $g_1 \in g$, $f_i \in f$, and $h_{ij} \in H$.

Although this algorithm converges to the minimum mean-square error under the assumption of Poisson noise, in practice the algorithm is virtually never allowed to go to convergence due to the computational time required and the fact that, after a point, the quality of the images produced is reduced. The quality degrades with increasing iterations because the ML-EM algorithm acts as a means of inverting the H matrix. However, as one skilled in the art would readily understand, H is generally computationally singular (it cannot really be inverted) and a method of regularizing (smoothing) the process is required. An acceptable regularization method consists of stopping the iteration process before the algorithm converges. A computer program implementing an ML-EM algorithm according to the invention is listed below as Appendix A.

Figure 5:
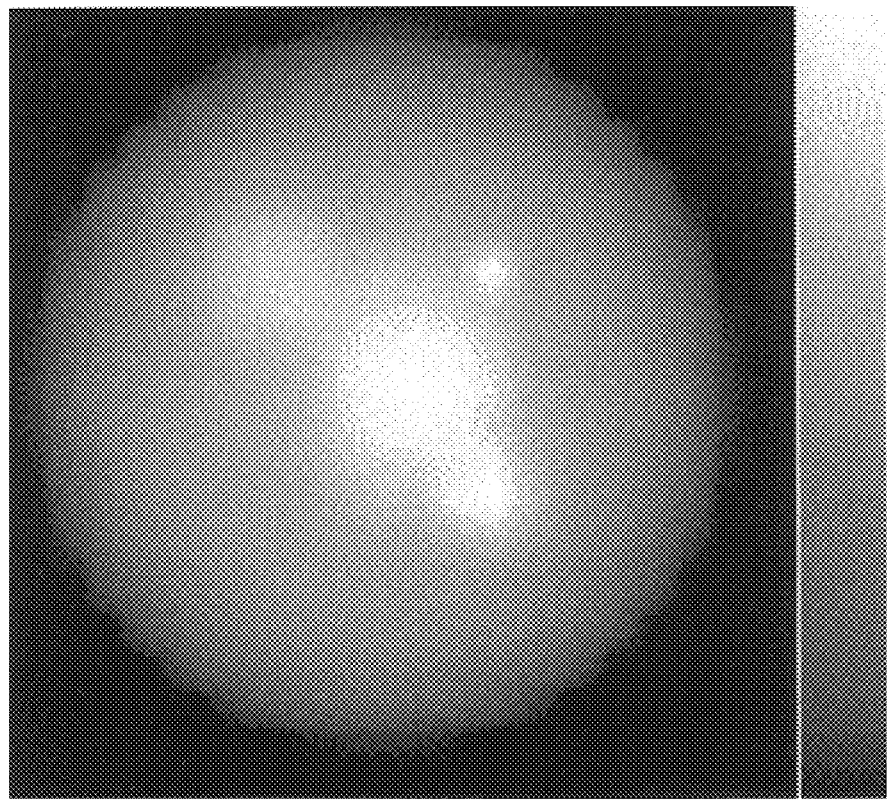
FIG. 5 is a representation of the true attenuation-compensated image of a sphere phantom reconstructed according to the invention.

The goal of this research was to develop a high-resolution alternative to the parallel-hole collimator for planar imaging. Therefore, comparisons studies, reported below, were performed between planar images generated by a parallel-hole collimator and a synthetic aperture according to the invention. The simulated system consisted of a high-resolution detector with 380 μm pixel size and a pinhole aperture with 0.5 mm diameter pinholes. The parameters varied were the number of pinholes in the aperture and the pinhole-detector distances. The phantom used for evaluation consisted of a number of uniformly-emitting spheres ranging in size from 2 cm to 0.5 mm in diameter. These spheres sat in a slab of uniformly attenuating medium. The true attenuation-compensated image of the phantom (the $\theta_j$ image) is shown in FIG. 5 at the resolution also used for the images reconstructed according to the invention.

It was assumed that the transfer functions from the different pinhole-detector distances constituted the description of a single imaging system. This combined transfer function was simulated on a three-dimensional voxelized grid, with cubic 1-mm voxels, and the projection data were generated using a numeric integration scheme. The data were reconstructed into a 3D image using the ML-EM procedure described above, and this 3D image was projected to 2D and compared to the true 2D projection shown in FIG. 5.

Figure 6A:
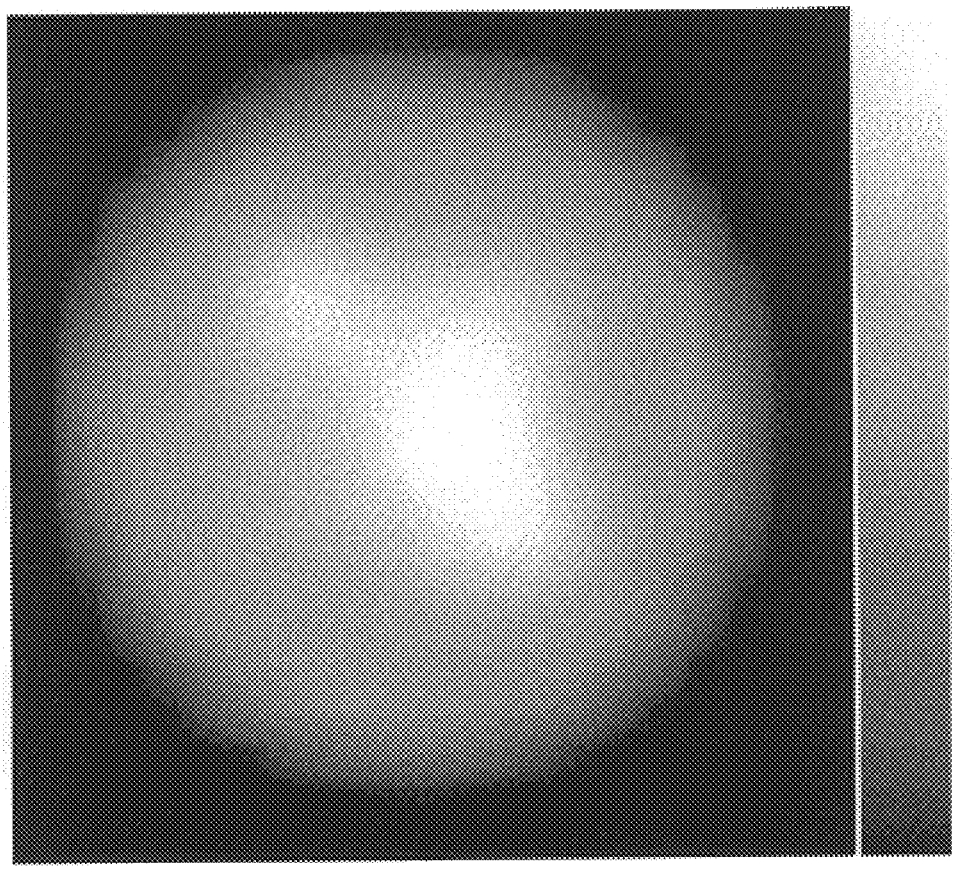
FIGS. 6(a) and 6(b) show reconstructions of the image of FIG. 5 from multiple-pinhole data with a pinhole-detector distance of 6 mm and 30 mm, respectively.
Figure 6B:
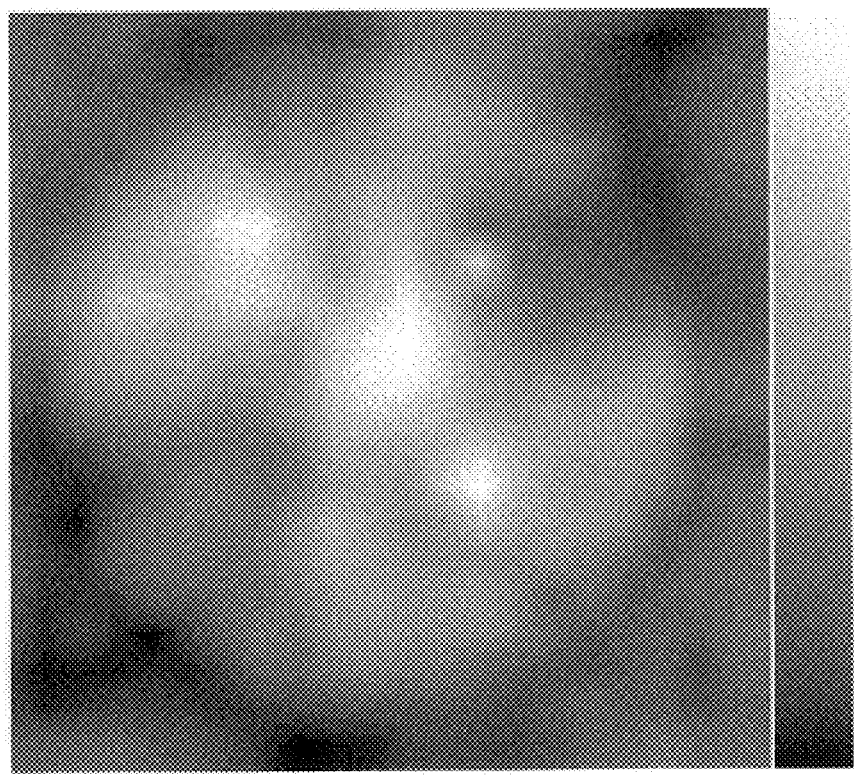

In order to demonstrate the importance of collecting data at multiple pinhole-detector distances, images reconstructed from projection data without this feature are shown in FIGS. 6(a) and 6(b). The aperture contained 100 pinholes jittered about a regular 10 by 10 array (the jittering was for sampling reasons). The reconstruction from a 6-mm pinhole-detector distance is given in FIG. 6(a), and the reconstruction from a 30-mm pinhole-detector distance in given in FIG. 6(b). The 6-mm reconstruction has reasonably good conformity with the true projection given in FIG. 5, but shows a reduced resolution compared to the true image. The 30-mm image does not demonstrate good agreement with FIG. 5; the effects of multiplexing are clearly seen.

Figure 7:
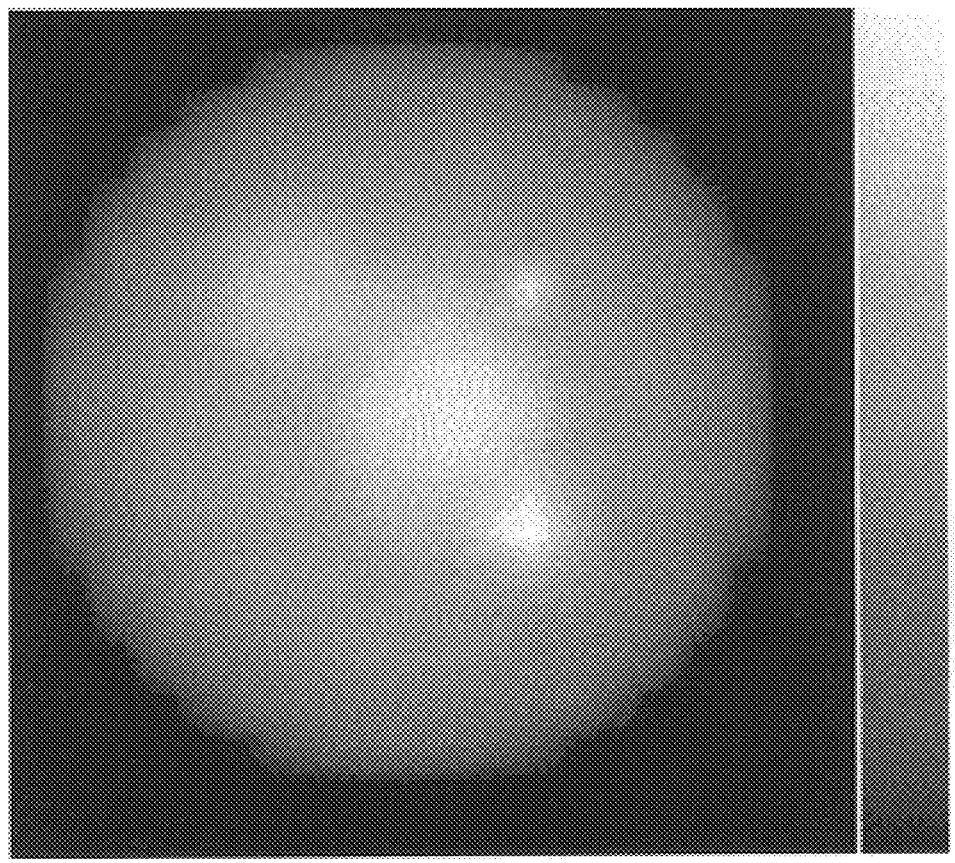
FIG. 7 shows a reconstruction of the image of FIG. 5 by the synthetic collimator of the invention using pinhole-detector distances of 6 mm, 10 mm, 18 mm, and 30 mm.

The synthetic-collimation operation of the invention was then performed. The projection data and system transfer functions from the 6-mm and 30-mm projections were combined with data from 10 mm and 18 mm. The reconstruction of the noise-free data is given in FIG. 7. This image clearly demonstrates advantages over the reconstruction given in FIGS. 6. The effects of multiplexing, seen in FIG. 6(b), have been largely removed. Additionally, the larger pinhole-detector distances appear to have led to improved resolution of the image in FIG. 7 compared to the image in FIG. 6(a).

Figure 8:
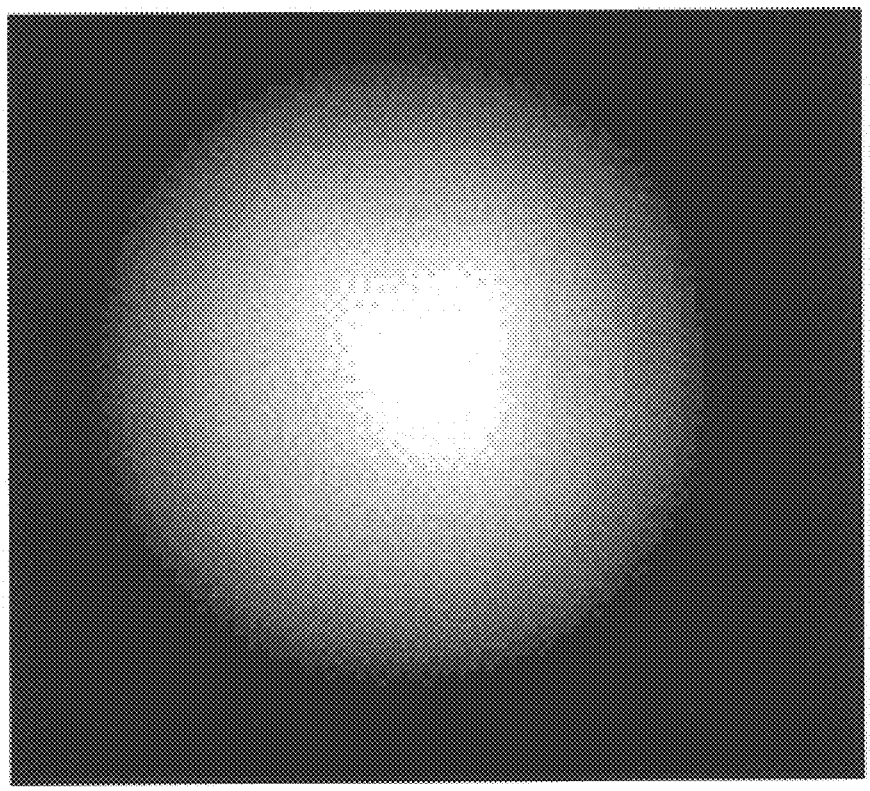
FIG. 8 shows a reconstruction of the image of FIG. 5 by the synthetic collimator of the invention using a parallel-hole collimator with a bore diameter of 1.4 mm and a bore length of 20 mm.

A parallel-hole collimator with a bore diameter of 1.4 mm and a bore length of 34 mm was then simulated. The noise-free projection of the same phantom through this collimator is shown in FIG. 8. The synthetic-collimator image produced according to the invention, seen in FIG. 7, appears to demonstrate a clear resolution superiority.

Figure 9A:
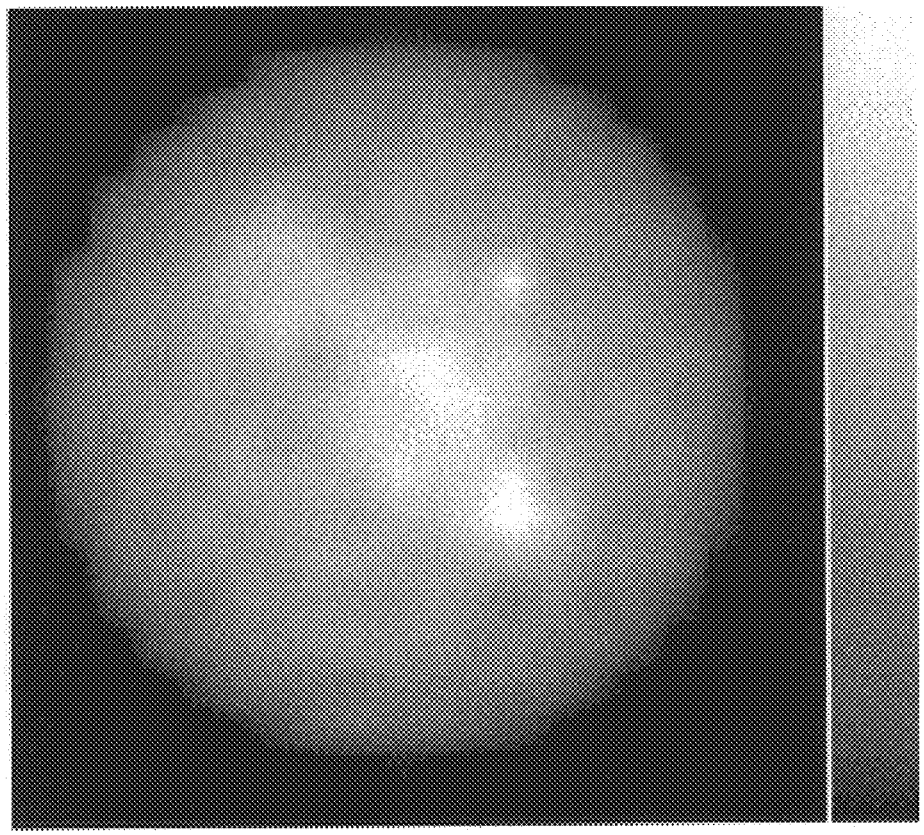
FIGS. 9(a), 9(b) and 9(c) show reconstructions of the image of FIG. 5 from the synthetic collimator of the invention with 1,000,000, 500,000, and 100,000 total projection counts, respectively.
Figure 9B:
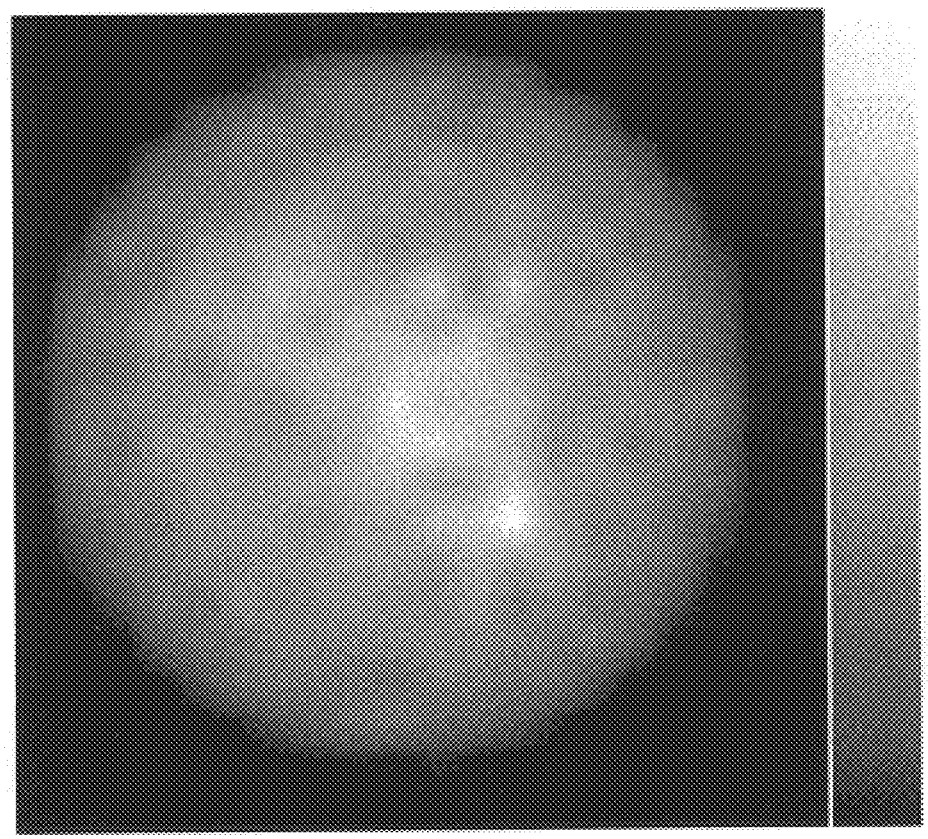
Figure 9C:
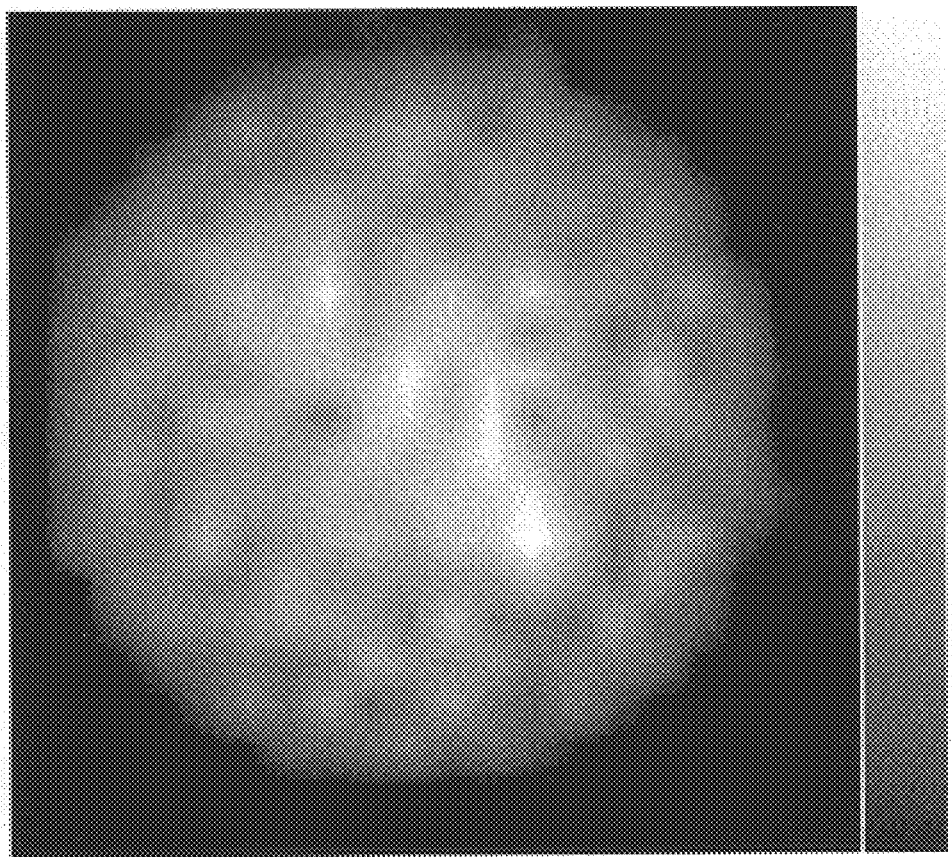

Finally, the 2D synthetic collimator was tested for noise properties. FIGS. 9(a), 9(b) and 9(c) give the 2D synthetic-collimator reconstructions for 1,000,000 total projection counts, 500,000 total projection counts, and 100,000 total projection counts, respectively. It is seen that noise degradations in the reconstructed image appear by 500,000 total counts. Therefore, more work is deemed desirable to explore noise properties of the 2D synthetic collimator and improve its performance.

We found that further advantages may exist in reconstructing 3D rather than 2D images from the synthetic-collimator projections. This is a surprising result because data from only one collimator-object angle are collected. At first glance, one would expect that this limited angular sampling would not allow estimates of a 3D set of $\theta_j$. However, each of the pinholes provides sampling from a different angle and, as shown below, it is this increased angular sampling that allows the reconstruction of the 3D $\theta_j$'s.

Figure 10:
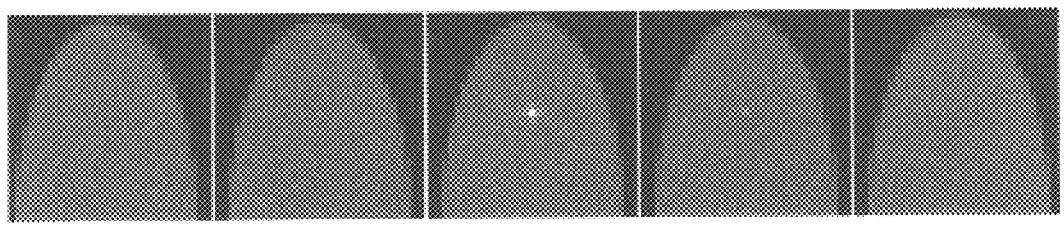
FIG. 10 shows five slice images through a 3D phantom used for testing the system of the invention.

The phantom used for testing the invention consisted of a single 3.0-mm diameter sphere embedded in a breast-shaped slab of a uniformly emitting and attenuating medium. The size of the reconstruction field was a 7 cm cube. (This small size was chosen due to computational constraints, but it is expected that larger fields of view can be used with equivalent results.) FIG. 10 shows five consecutive 2D slices through the region of the simulated lesion in the 3D phantom.

The system matrix, H, was simulated on a three-dimensional voxelized grid, with cubic 2.0-mm voxels. The projection data were generated using a numeric integration scheme. Low-resolution and high-resolution 8×8-cm detectors were used for the simulation. The low-resolution detector was simulated with a pixel size of 2.5 mm, similar to the resolution of a typical Anger camera. The high-resolution detector had a pixel size of 0.5 mm.

Figure 11A:
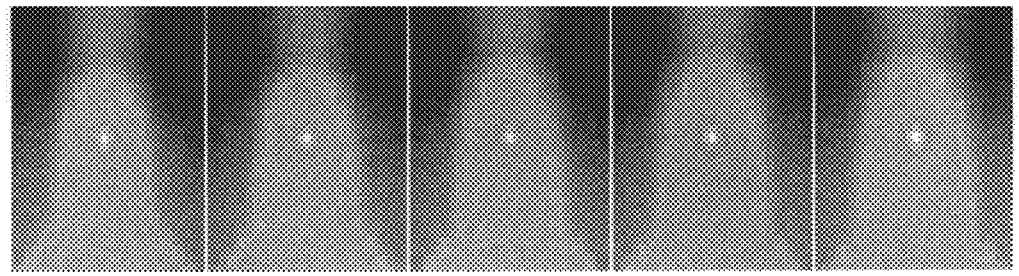
FIG. 11(a) is a reconstruction of the images of FIG. 10 obtained using a single-pinhole multiple-level collimator.
Figure 11B:
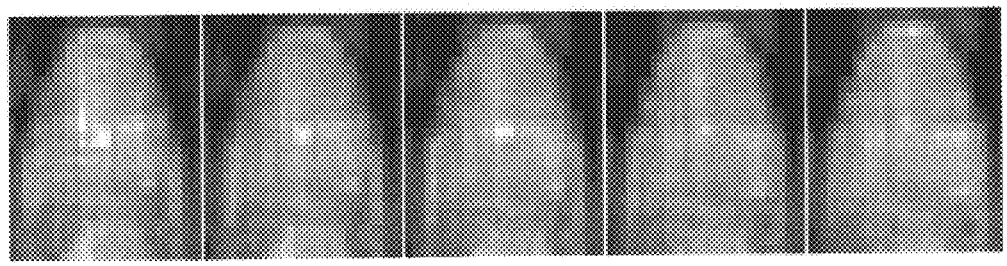
FIG. 11(b) is a reconstruction of the images of FIG. 10 obtained using a multiple-pinhole collimator with a 30-mm pinhole-detector distance.
Figure 11C:
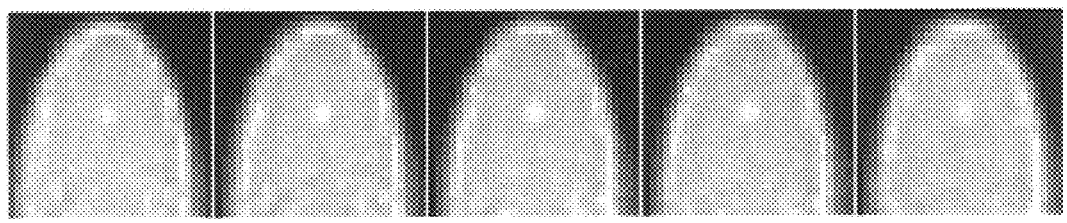
FIG. 11(c) is a reconstruction of the images of FIG. 10 obtained using a multiple-pinhole collimator with a 6-mm pinhole-detector distance.
Figure 11D:
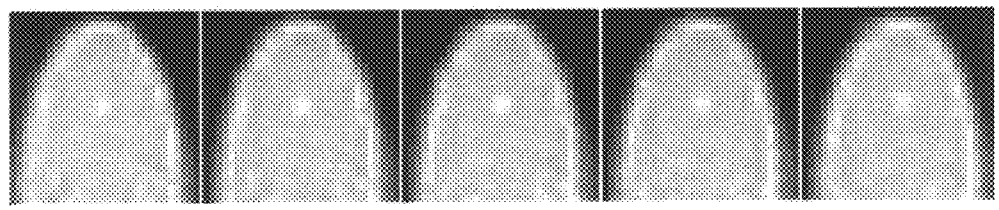
FIG. 11(d) is a reconstruction of the images of FIG. 10 obtained using a multiple-pinhole collimator with 6-mm to 30-mm pinhole-detector distances according to the invention.
Figure 11E:
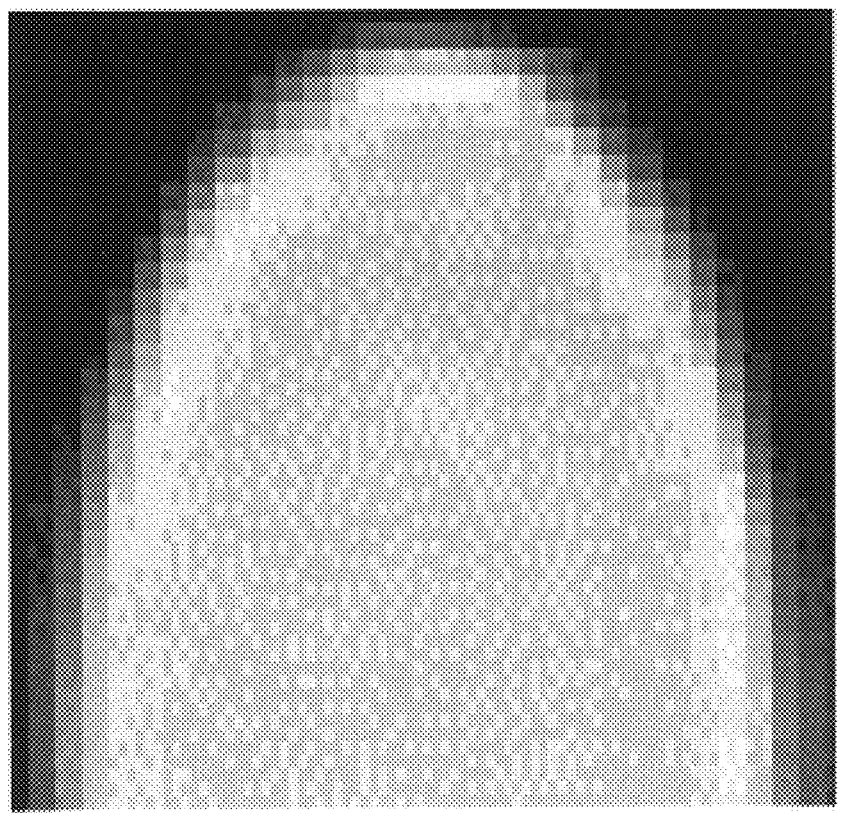
FIG. 11(e) is a reconstruction of the images of FIG. 10 obtained using the 2D synthetic collimator of the invention.
Figure 11F:
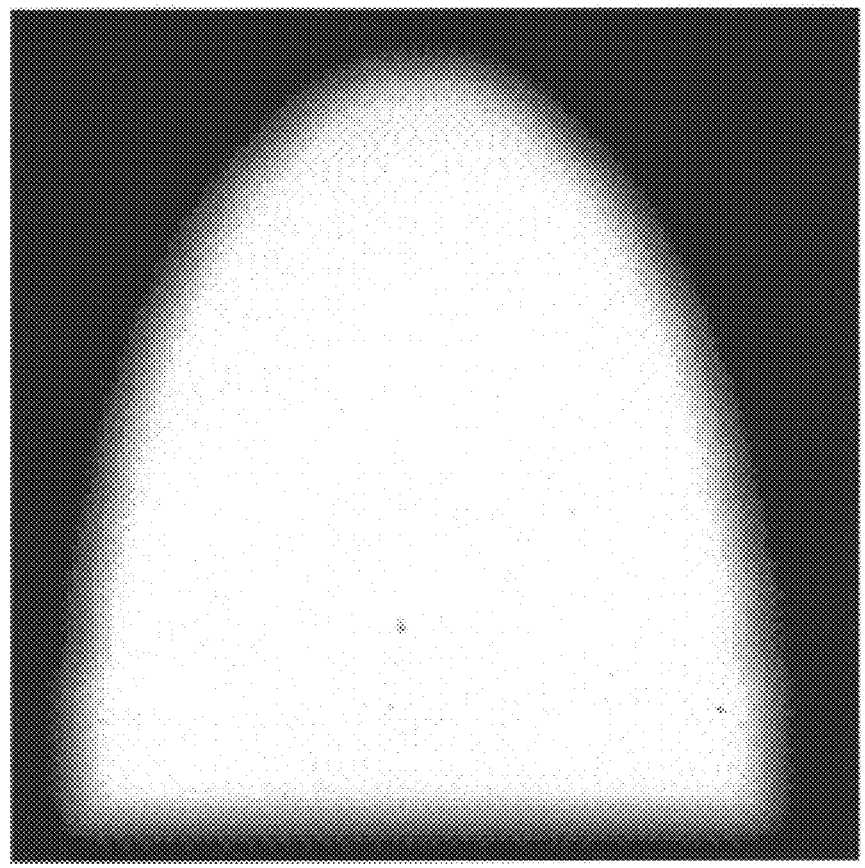
FIG. 11(f) is a reconstruction of the images of FIG. 10 obtained using a parallel-hole collimator.

The images reconstructed form projection data obtained both with and without the features of the invention establish again the advantages of using multiple pinholes and multiple pinhole-detector distances according to the invention. FIGS. 11(a–f) show reconstructed projections (2.5 mm-pixel detector) of the phantom slices shown in FIG. 10 for noise-free data. FIG. 11(a) corresponds to a single pinhole system and pinhole-detector distances of 6 mm, 10 mm, 18 mm, and 30 mm; FIG. 11(b), a collimator with 36 pinholes and a pinhole-detector distance of 30 mm; FIG. 11(c), the same 36-pinhole collimator and a 6-mm pinhole-detector distance; and FIG. 11(d), the 64-pinhole collimator with 6-mm, 10-mm, 18-mm, and 30-mm pinhole-detector distances (the 3D synthetic collimator). Finally, FIGS. 11(e) and 11(f) show simulated results from both the 2D synthetic collimator and a simulated high-resolution parallel-hole collimator (34-mm bore length, 1.4-mm bore diameter, and no collimator-detector separation).

Many of the properties of synthetic collimation are demonstrated in FIGS. 11. FIG. 11(a) verifies the expected result that angular sampling from only a single pinhole leads to severe artifacts in the reconstructed image. FIG. 11(b) shows that the multiplexing of the data from a 30-mm pinhole-detector distance also leads to artifacts in the reconstructed image. For a 6-mm pinhole-detector distance, seen in FIG. 11(c), there are reduced multiplexing artifacts but also relatively poor resolution. Finally, reconstructions from data collected with both multiple-pinhole and multiple pinhole-detector distance, seen in FIG. 11(d), appear to possess both good resolution compared to FIG. 11(c) and fewer artifacts than in FIGS. 11(a) and 11(b).

Figure 12A:
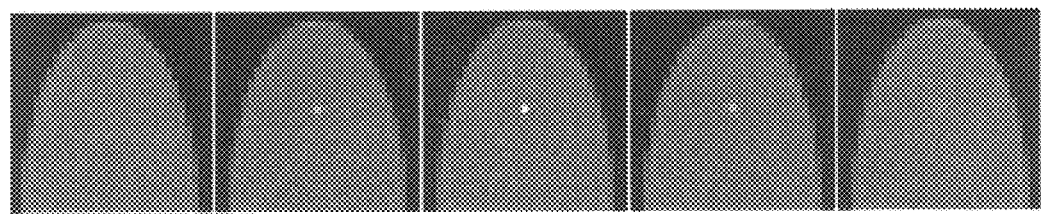
FIGS. 12(a) and 12(b) are images produced with a high-resolution detector using the 3D synthetic collimator of the invention and a high-resolution parallel-hole collimator, respectively.
Figure 12B:
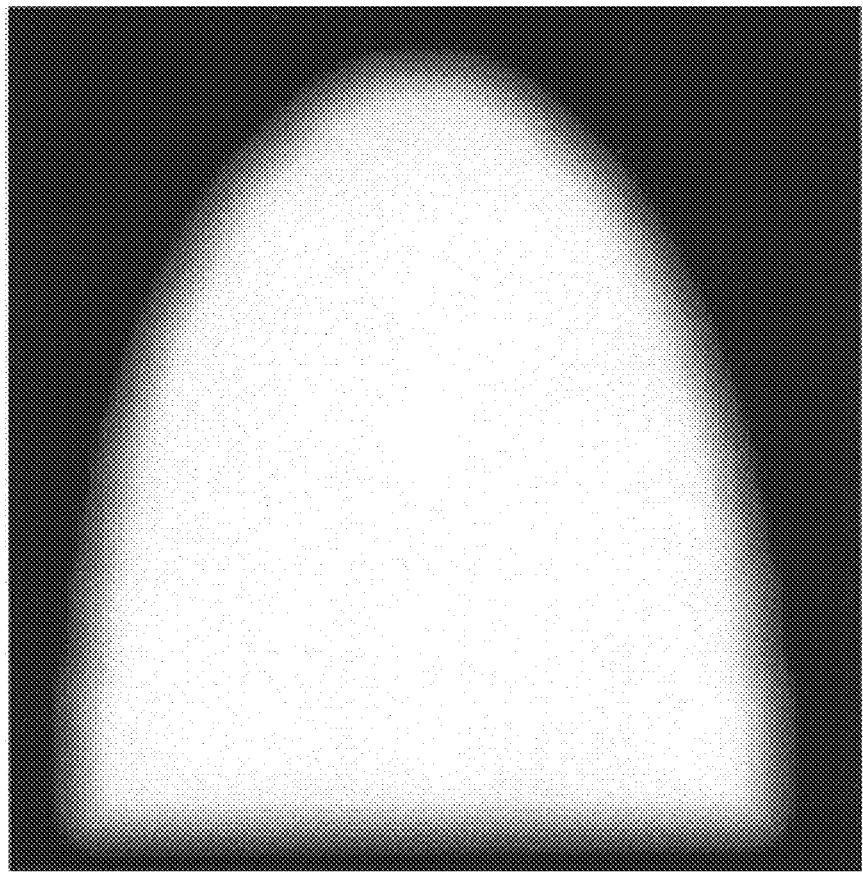

FIG. 12(a) shows the slices of FIG. 10 obtained from reconstructions using the 3D synthetic collimator of the invention in combination with the high-resolution (0.5-mm pixel) detector. FIG. 12(b) gives the unreconstructed projection using the high-resolution parallel-collimator. The high-resolution detector appears to have significantly improved the ability of the synthetic collimator to image the phantom lesion, while it had little effect for the parallel-hole-collimated data. This latter result is not surprising since the spatial resolution is limited by the resolution of the collimator and the contrast resolution is limited by the inability to resolve in the direction perpendicular to the plane of the detector.

Figure 13:
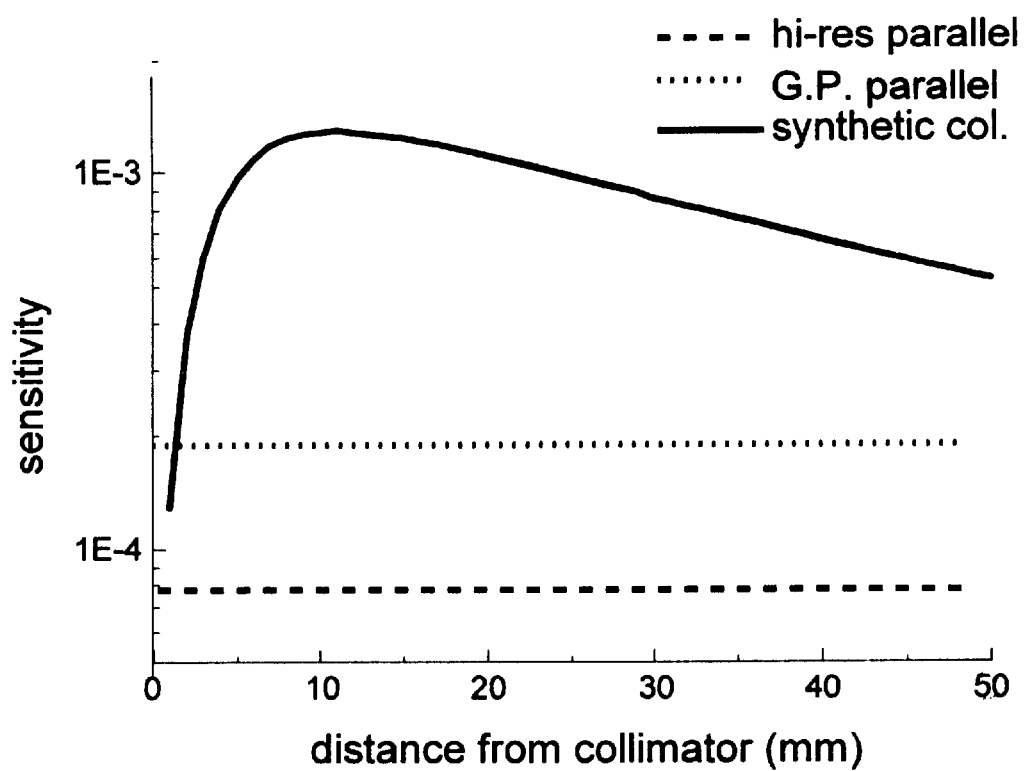
FIG. 13 is a graph of the sensitivity of general-purpose and high-resolution parallel-hole collimators and of the synthetic collimator of the invention as a function of source/collimator distance.
Figure 14:
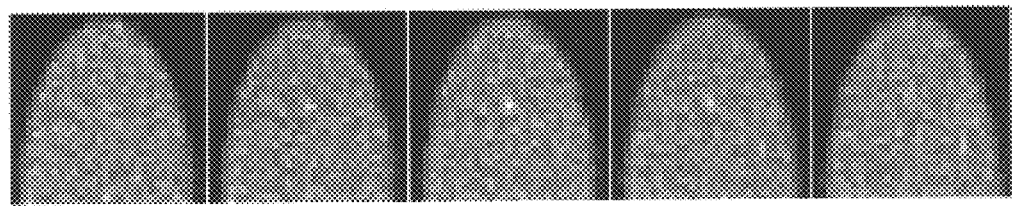
FIG. 14 is a reconstruction of the images of FIG. 10 obtained from the 3D synthetic collimator of the invention with a high-resolution detector, no attenuation compensation and 1,000,000 total projection counts.

Other important differences between the real an expected data are incorrect attenuation compensation and limited-photon noise. In order to arrive at simulated noise levels, it is necessary to determine the sensitivity of the synthetic collimator. FIG. 13 shows the sensitivity of the synthetic collimator as a function of collimator-source distance. Also shown are the sensitivities of high-resolution and general-purpose parallel-hole collimators. It is seen that the synthetic collimator is superior to parallel-hole collimators in terms of photons collected. FIG. 14 shows reconstructions of the attenuated projection data with no attenuation compensation and with Poisson noise at 1,000,000 total projection counts. The synthetic-collimator system appears fairly robust with respect to both noise and attenuation compensation.

These simulations demonstrate that the concept of the synthetic collimator of the invention has advantages over standard parallel-hole collimators in terms of resolution and sensitivity.

Additionally, advantages in contrast resolution have been shown to exist for the synthetic collimator if 3D, rather than 2D, imaging is performed. It has also been demonstrated that the collimator performs robustly in the face of limited-photon noise and improper attenuation compensation.

Thus, a new technique has been devised for obtaining parallel projections of a 3D object without the use of a parallel-bore collimator. The method could be thought of as a "software collimator" or "synthesized collimator." The resulting image is similar to one obtained by a collimator, but the spatial resolution is substantially improved and has the additional advantage of being approximately constant over a substantial range of depths in the object. In addition, many more photons are collected than with a conventional collimator.

The experiments show that best results are obtained by including data collected, at least, at a small pinhole-detector distance, with minimal multiplexing but low magnification, and at a large pinhole-detector distance, with high magnification but a great deal of multiplexing. The images reconstructed from the low-resolution data showed little effect of multiplexing, but demonstrated poor resolution. When only high-magnification data were used, the reconstructed images showed increased resolution but severe multiplexing artifacts. Combining these data sets according to the invention, however, produced reconstructions with good resolution and greatly reduced multiplexing effects as compared to reconstructions from single-magnification data alone.

From these experiments we concluded that it is necessary to collect data from both a pinhole-detector distance with minimal multiplexing and a pinhole-detector distance with high magnification. Adding intermediate pinhole-detector distance data appears to improve the quality of the reconstructions. While no quantitative analysis was employed to determine an optimal number of pinhole-detector distances, it was found that, qualitatively, four such distances produced a reconstructed image consistently of much better quality than produced by conventional techniques.

It is noted that the closest competitive approaches to this invention are the rotating slit aperture and the rotating slat collimator. After suitable computer processing, the rotating slit yields effectively a pinhole projection and the rotating slat collimator gives essentially the same image as a parallel-bore collimator. Thus, both kinds of image suffer from variation of resolution with depth, attenuation and septal penetration. These effects can be eliminated with the approach of the invention.

Various other changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

We claim:

1. A method of reconstructing a two-dimensional image produced by a collimator using a coded-aperture system wherein a photon flux from an object is received by a detector after passing through a coded aperture, comprising the following steps:

(a) recording a plurality of detector measurements of said photon flux, wherein at least some of the measurements are taken varying a spacing between the coded aperture and the detector;

(b) calculating a volumetric distribution of the photon flux from the object on the basis of said plurality of detector measurements; and (c) integrating the photon flux from the object over parallel cylindrical projections of said coded aperture through the object using the volumetric distribution calculated in step (b).

2. The method described in claim 1, wherein said plurality of detector measurements of radiation comprises at least a measurement from an aperture-detector distance adapted to minimize multiplexing and a measurement from an aperture-detector distance adapted to maximize magnification.

3. The method described in claim 2, wherein said plurality of detector measurements of photon flux comprises four measurements.

4. The method described in claim 1, wherein said step (b) is carried out using a maximum-likelihood expectation-maximization algorithm.

5. The method described in claim 1, wherein said coded aperture is a multiple pinhole aperture.

6. A method of reconstructing a two-dimensional image produced by a collimator using a coded-aperture system wherein photon flux from an object is received by a detector after passing through a coded aperture, comprising the following steps:
  (a) recording a plurality of detector measurements of said photon flux, wherein at least some of the measurements are taken varying a spacing between the coded aperture and the object;
  (b) calculating a volumetric distribution of the photon flux from the object on the basis of said plurality of detector measurements; and
  (c) integrating the photon flux from the object over parallel cylindrical projections of said coded aperture through the object using the volumetric distribution calculated in step (b).

7. The method described in claim 6, wherein said plurality of detector measurements of photon flux comprises at least a measurement from an aperture-detector distance adapted to minimize multiplexing and a measurement from an aperture-detector distance adapted to maximize magnification.

8. The method described in claim 7, wherein said plurality of detector measurements of photon flux comprises four measurements.

9. The method described in claim 6, wherein said step (b) is carried out using a maximum-likelihood expectation-maximization algorithm.

10. The method described in claim 6, wherein said coded aperture is a multiple pinhole aperture.

11. Apparatus for reconstructing a two-dimensional image produced by a collimator using a coded-aperture system wherein photon flux from an object is received by a detector after passing through a coded aperture, comprising the following components:
  a stage for supporting an object to be imaged;
  a detector for recording measurements of photon flux by said object;
  a coded aperture positioned between said object and said detector;
  means for varying a spacing between the coded aperture and the detector;
  means for calculating a volumetric distribution of the photon flux from the object on the basis of a plurality of detector measurements taken varying said spacing between the coded aperture and the detector; and
  means for integrating the photon flux from the object over parallel cylindrical projections of said coded aperture through the object using said volumetric distribution of the photon flux from the object.

12. The apparatus described in claim 11, wherein said plurality of detector measurements of photon flux comprises at least a measurement from an aperture-detector distance adapted to minimize multiplexing and a measurement from an aperture-detector distance adapted to maximize magnification.

13. The apparatus described in claim 12, wherein said plurality of detector measurements of photon flux comprises four measurements.

14. The apparatus described in claim 11, wherein said means for calculating a volumetric distribution of the photon flux from the object on the basis of a plurality of detector measurements taken varying said spacing between the coded aperture and the detector includes a maximum-likelihood expectation-maximization algorithm.

15. The apparatus described in claim 11, wherein said coded aperture is a multiple pinhole aperture.

16. Apparatus for reconstructing a two-dimensional image produced by a collimator using a coded-aperture system wherein photon flux from an object is received by a detector after passing through a coded aperture, comprising the following components:
  a stage for supporting an object to be imaged;
  a detector for recording measurements of photon flux from said object;
  a coded aperture positioned between said object and said detector;
  means for varying a spacing between the coded aperture and the object;
  means for calculating a volumetric distribution of the photon flux from the object on the basis of a plurality of detector measurements taken varying said spacing between the coded aperture and the object; and
  means for integrating the photon flux from the object over parallel cylindrical projections of said coded aperture through the object using said volumetric distribution of the photon flux from the object.

17. The apparatus described in claim 16, wherein said plurality of detector measurements of photon flux comprises at least a measurement from an aperture-detector distance adapted to minimize multiplexing and a measurement from an aperture-detector distance adapted to maximize magnification.

18. The apparatus described in claim 17, wherein said plurality of detector measurements of photon flux comprises four measurements.

19. The apparatus described in claim 16, wherein said means for calculating a volumetric distribution of the photon flux from the object on the basis of a plurality of detector measurements taken varying said spacing between the coded aperture and the object includes a maximum-likelihood expectation-maximization algorithm.

20. The apparatus described in claim 16, wherein said coded aperture is a multiple pinhole aperture.

* * * * *